`US009767004B2`

United States Patent
Yang et al.

(10) Patent No.: US 9,767,004 B2
(45) Date of Patent: Sep. 19, 2017

(54) DYNAMIC CALL TRACKING METHOD BASED ON CPU INTERRUPT INSTRUCTIONS TO IMPROVE DISASSEMBLY QUALITY OF INDIRECT CALLS

(71) Applicant: Symantec Corporation, Mountain View, CA (US)

(72) Inventors: Hong Yi Yang, Chengdu (CN); Rui Guo, Chengdu (CN)

(73) Assignee: Symantec Corporation, Mountain View, CA (US)

( * ) Notice: Subject to any disclaimer, the term of this patent is extended or adjusted under 35 U.S.C. 154(b) by 347 days.

(21) Appl. No.: 14/305,580

(22) Filed: Jun. 16, 2014

(65) Prior Publication Data

US 2015/0363198 A1 Dec. 17, 2015

(51) Int. Cl.
G06F 9/44 (2006.01)
G06F 11/36 (2006.01)
G06F 9/45 (2006.01)

(52) U.S. Cl.
CPC ............ *G06F 11/3624* (2013.01); *G06F 8/53* (2013.01)

(58) Field of Classification Search
CPC ........................................................ G06F 9/44
USPC ................. 717/106, 124, 127–131, 136, 159
See application file for complete search history.

(56) References Cited

U.S. PATENT DOCUMENTS

| | | | | |
|---|---|---|---|---|
| 5,313,614 A * | 5/1994 | Goettelmann | ............ | G06F 8/52 717/138 |
| 5,724,590 A * | 3/1998 | Goettelmann | ............ | G06F 8/52 711/E12.014 |
| 5,862,384 A * | 1/1999 | Hirai | ....................... | G06F 8/443 717/154 |
| 5,956,479 A * | 9/1999 | McInerney | ......... | G06F 11/3664 714/38.13 |
| 6,167,358 A * | 12/2000 | Othmer | ............... | G06F 11/0748 702/188 |
| 6,189,144 B1 * | 2/2001 | Weber | ....................... | G06F 8/54 707/999.104 |
| 6,282,705 B1 * | 8/2001 | Futamata | ................ | G06F 8/433 710/262 |
| 6,351,844 B1 * | 2/2002 | Bala | ...................... | G06F 9/3808 712/209 |
| 6,560,692 B1 * | 5/2003 | Kudo | ..................... | G06F 9/3004 711/121 |
| 6,665,735 B1 * | 12/2003 | Tanaka | ................ | G06F 9/44521 717/163 |
| 6,748,584 B1 * | 6/2004 | Witchel | .................... | G06F 8/71 714/37 |
| 7,886,287 B1 * | 2/2011 | Davda | ....................... | G06F 8/67 711/200 |

(Continued)

*Primary Examiner* — Jae Jeon
(74) *Attorney, Agent, or Firm* — Patterson + Sheridan, LLP

(57) ABSTRACT

Embodiments presented herein describe techniques to track and correct indirect function calls in disassembled object code. Assembly language source code is generated from a binary executable object. The assembly language source code may include indirect function calls. Memory addresses associated with the function calls are identified. A central processing unit (CPU) interrupt instruction is inserted in the disassembled source code at each indirect function call. The disassembled source code is executed. When the interrupt at each indirect function call is triggered, the function name of a function referenced by a register may be determined.

20 Claims, 4 Drawing Sheets

(56) References Cited

U.S. PATENT DOCUMENTS

| | | | | |
|---|---|---|---|---|
| 8,930,916 B1* | 1/2015 | Soeder | ............... | G06F 8/75 |
| | | | | 717/131 |
| 2003/0074650 A1* | 4/2003 | Akgul | ............... | G06F 11/3624 |
| | | | | 717/129 |
| 2004/0055003 A1* | 3/2004 | Sundaram | ............... | G06F 9/463 |
| | | | | 718/108 |
| 2004/0083460 A1* | 4/2004 | Pierce | ............... | G06F 9/4426 |
| | | | | 717/131 |
| 2005/0183069 A1* | 8/2005 | Cepulis | ............... | G06F 11/3636 |
| | | | | 717/128 |
| 2007/0250819 A1* | 10/2007 | Fjeldstad | ............... | G06F 11/3664 |
| | | | | 717/129 |
| 2008/0163185 A1* | 7/2008 | Goodman | ............... | G06F 9/44521 |
| | | | | 717/151 |
| 2009/0031290 A1* | 1/2009 | Feng | ............... | G06F 8/456 |
| | | | | 717/126 |
| 2009/0240931 A1* | 9/2009 | Coon | ............... | G06F 9/30054 |
| | | | | 712/234 |
| 2009/0307532 A1* | 12/2009 | Raber | ............... | G06F 11/3644 |
| | | | | 714/38.13 |
| 2010/0088688 A1* | 4/2010 | Edwards | ............... | G06F 8/54 |
| | | | | 717/151 |
| 2010/0192122 A1* | 7/2010 | Esfahan | ............... | G05B 19/0426 |
| | | | | 717/105 |
| 2010/0251378 A1* | 9/2010 | Eker | ............... | G06F 21/14 |
| | | | | 726/26 |
| 2013/0152050 A1* | 6/2013 | Chang | ............... | G06F 11/0742 |
| | | | | 717/125 |
| 2014/0259011 A1* | 9/2014 | Tashiro | ............... | G06F 9/45558 |
| | | | | 718/1 |
| 2015/0058825 A1* | 2/2015 | Madampath | ............... | G06F 11/34 |
| | | | | 717/128 |

* cited by examiner

DYNAMIC CALL TRACKING METHOD BASED ON CPU INTERRUPT INSTRUCTIONS TO IMPROVE DISASSEMBLY QUALITY OF INDIRECT CALLS

BACKGROUND

Field

Embodiments presented herein generally relate to software tools used to disassemble compiled software. More specifically, embodiments presented herein describe techniques for correcting indirect function call values output in program code disassembly.

Description of the Related Art

A disassembler is a computer program that translates executable computer code (e.g., binary instructions) into assembly language. Disassembled code is often formatted for human-readability, (rather than as proper input to an assembler). Such formatting makes disassembly particularly useful for reverse engineering. Indeed, disassemblers are used extensively in several computing industries. For example, disassemblers have significance in the computer security industry. During security audits, companies often need to analyze the run-time behavior of computer applications. As a result, such companies rely on disassemblers to break down machine language into a human-readable assembly language format.

However, existing disassemblers have limitations. For example, consider indirect calls in a computer application. In computer programming, indirect function calls (e.g., virtual function calls, indicator function calls, etc.) are calls to a function via a function pointer (i.e., a memory address of the function). When source code is compiled, indirect function calls are generally converted to register calls, such as "call [ebx]," where refers to the EBX processor register. However, when a disassembler processes the resulting machine code, the disassembler has inadequate information to ascertain names of functions corresponding to indirect function calls. Consequently, the resulting disassembly may be inaccurate. Although the register names and values may be obtained using dynamic debugging techniques, one ordinarily has to evaluate each register call manually. Such an approach can be impractical for many programs.

SUMMARY

One embodiment includes a method for disassembling compiled object code. The method may generally include disassembling a binary executable object to generate assembly language source code. The assembly language source code includes one or more indirect function calls. The method may also include inserting an interrupt in the assembly language source code at each indirect function call. The assembly language source code is executed. Upon reaching the interrupt at each indirect function call while executing the assembly language source code, a register value stored in a register specified in the indirect function call is determined. For each indirect function call, in the assembly language source code, the register specified in the indirect function call is replaced with a function name corresponding to the register value.

Another embodiment includes a computer-readable storage medium having instructions, which, when executed on a processor, performs an operation for disassembling compiled object code. The operation may generally include disassembling a binary executable object to generate assembly language source code. The assembly language source code includes one or more indirect function calls. The operation may also include inserting an interrupt in the assembly language source code at each indirect function call. The assembly language source code is executed. Upon reaching the interrupt at each indirect function call while executing the assembly language source code, a register value stored in a register specified in the indirect function call is determined. For each indirect function call, in the assembly language source code, the register specified in the indirect function call is replaced with a function name corresponding to the register value.

Still another embodiment includes a system having a processor and a memory storing a program, which, when executed on the processor, performs an operation for disassembling compiled object code. The operation may generally include disassembling a binary executable object to generate assembly language source code. The assembly language source code includes one or more indirect function calls. The operation may also include inserting an interrupt in the assembly language source code at each indirect function call. The assembly language source code is executed. Upon reaching the interrupt at each indirect function call while executing the assembly language source code, a register value stored in a register specified in the indirect function call is determined. For each indirect function call, in the assembly language source code, the register specified in the indirect function call is replaced with a function name corresponding to the register value.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments presented herein describe techniques for accurately tracking function names invoked by indirect function calls when disassembling executable code. In one embodiment, a disassembler receives computer modules to be disassembled. The disassembler evaluates each indirect function call to obtain address information for each such call. Using the address information, the disassembler converts the indirect function calls to CPU interrupt instructions. After doing so, the disassembler executes the targeted modules. When the converted CPU interrupt instructions are triggered, the disassembler captures information generated by the instructions (e.g., the called address, register values, etc.). Doing so allows the disassembler to use the captured information to identify and correct function names that are inaccurate in the disassembled code.

Advantageously, embodiments allow a disassembler to accurately track functions called by indirect function calls in disassembled code. Because the disassembler automatically corrects function names associated indirect function calls, a user does not have to manually examine each indirect function call individually to correct the values. Further, the disassembler corrects the values as the targeted module is running. As a result, the quality of disassembly is significantly improved relative to more conventional disassembly techniques, such as static disassembly and dynamic debugging.

Figure 1:
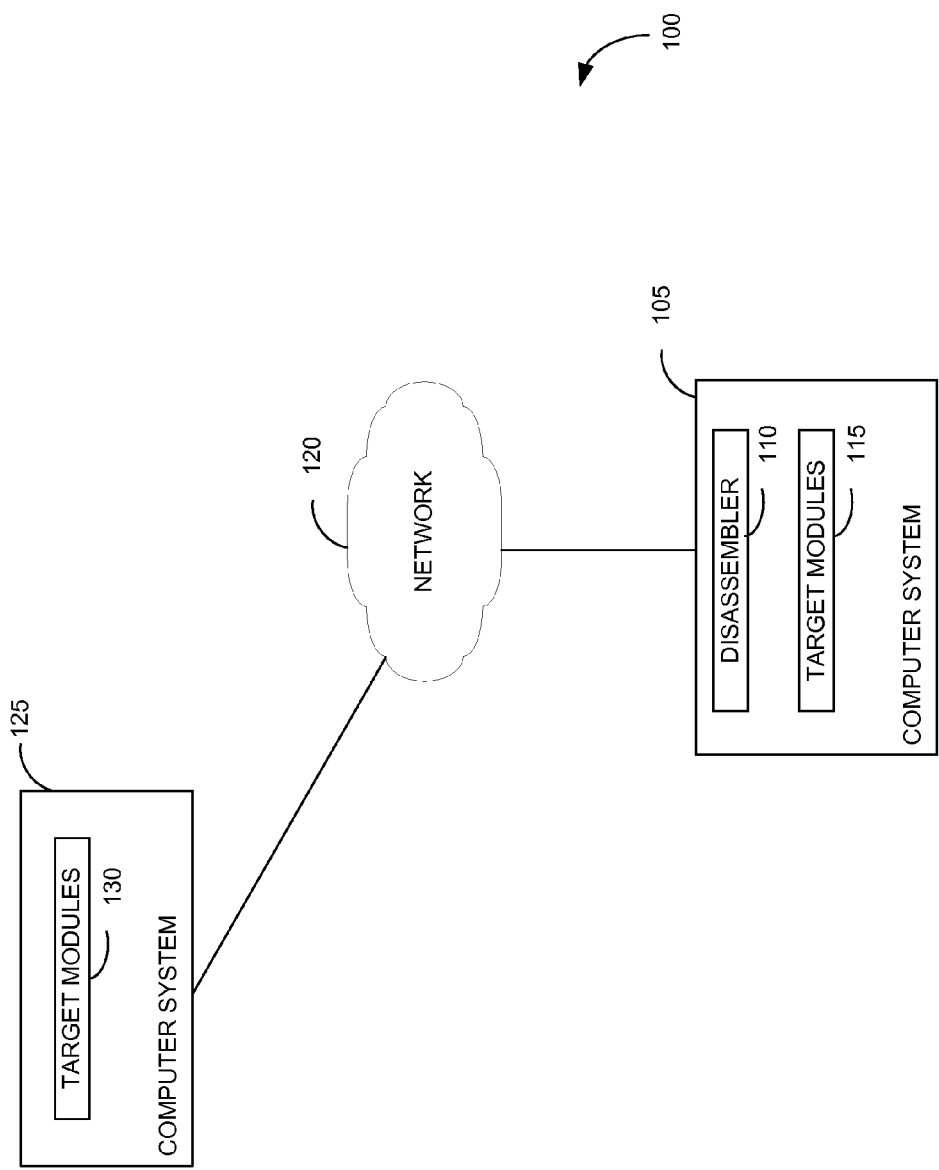
FIG. 1 illustrates an example computing environment 100, according to one embodiment.

FIG. 1 illustrates an example computing environment 100, according to one embodiment. As shown, the computing environment 100 includes a computer system 105. The computer system 105 includes a disassembler 110 and target modules 115. Target modules 115 are binary executable objects targeted to be disassembled by the computer system 105. The target modules may be executable files of different formats, such as Windows .exe, .sys, and .dll files or Linux binary files. The computer system 105 may obtain target modules 115 from a variety of sources. For example, the target modules 115 may be downloaded over the network 120 from computer systems 125 that host target modules 130.

The disassembler 110 generates assembly language source code from machine-executable code. The disassembler 110 may support different types of executable formats for target modules 115 for different processors and operating systems. When translating the machine language code of the target modules 115 into assembly language code, the disassembler 110 tracks any indirect function calls and stores the correct function name associated with each indirect function call in the disassembled code.

In one embodiment, the disassembler 110 generates human-readable assembly language from machine-executable code that may be used in further analyses. However, during the initial disassembly process, the disassembler 110 does not have enough information for functions names invoked by indirect function calls (i.e., to a function call invoked by referencing a memory address in a registered). As a result, when the disassembler 110 initially generates assembly language for an indirect function call, the function names used in the call may be inaccurate. Therefore, replacing inaccurate register values from the disassembled code significantly improves the quality of the disassembled code. The code ultimately produced by the disassembler 110 yields meaningful information in various efforts that require analysis of a target module 115, such as in security analysis, security audit, debugging, and so on.

Figure 2:
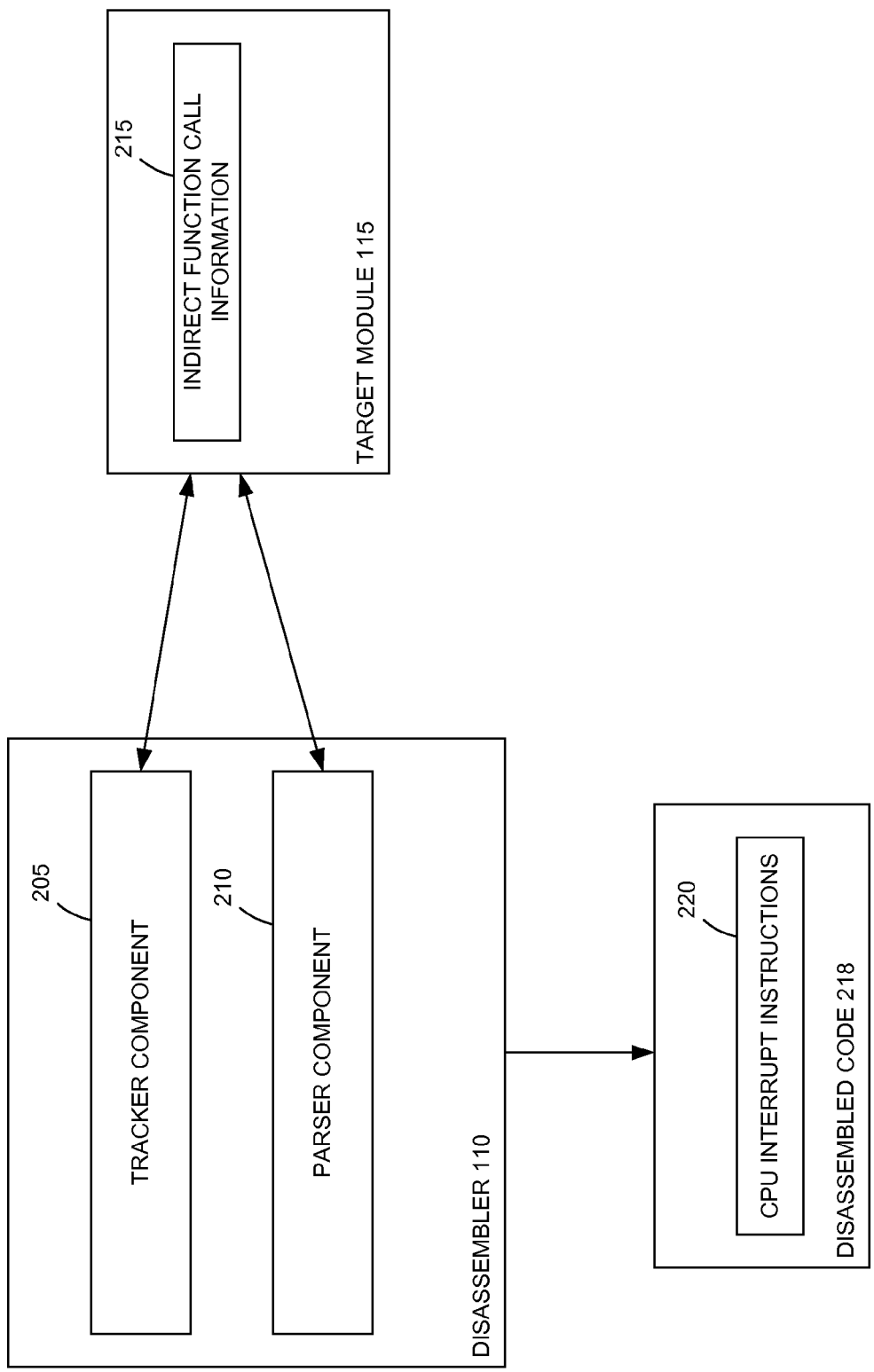
FIG. 2 illustrates a disassembler configured to track indirect function calls, according to one embodiment.

FIG. 2 further illustrates the disassembler 110, according to one embodiment. Generally, the disassembler 110 generates assembly language source code (shown in FIG. 2 as disassembled code 210) from machine language code of a target module 115. Typically, when source code that includes indirect function calls is compiled, the indirect function calls are compiled into special CPU instructions, such as "call [ebx]," where EBX is the name of the register. When the disassembler 110 initially generates the disassembled code 210, register values (such as the address stored in the register EBX) may not provide an accurate function name in the disassembled code 210.

In one embodiment, the disassembler 110 may include two debugger components used to correct such inaccuracies: a tracker component 205 and a parser component 210. The tracker component 205 is configured to receive indirect function call information 215 from the target module 115 and use the information 215 to convert the indirect function calls to CPU interrupt instructions 220. The parser component 210 is configured to retrieve function names using the interrupt instructions 220 during an execution of the target module 115. The parser component 210 corrects inaccurate function names in the disassembled code 218 based on the information retrieved during execution of the disassembled code 218.

As shown, the target module 115 includes indirect function call information 215. The indirect function call information 215 may include memory addresses corresponding to the location of the function call. The tracker component 205 parses the indirect function call information 215 and replaces indirect function call with a CPU interrupt instruction 220 in the assembly language code. For example, a CPU interrupt instruction 220 such as "INT 3" may be used, where "INT 3" is a breakpoint instruction that interrupts a running program and transfers control to a debugger. Generally, this CPU interrupt instruction 220 typically occupies 1 byte of memory.

Once each indirect function call is converted to CPU interrupt instructions 220, the disassembler 119 may execute the disassembled code 218 in a debug mode. The CPU interrupt instructions 220 are triggered during runtime at addresses where an indirect function call was previously invoked. When a CPU interrupt instruction 220 is triggered, the tracker component 205 can capture information passed to the parser component 210. Doing so allows the parser component 210 to identify accurate function names and register values for each indirect function call of the target module 115. In turn, the parser component 210 corrects inaccurate values in the disassembled code 218. The parser component 210 iterates through the disassembled code 218 and replaces any incorrect call information with the correct information.

Figure 3:
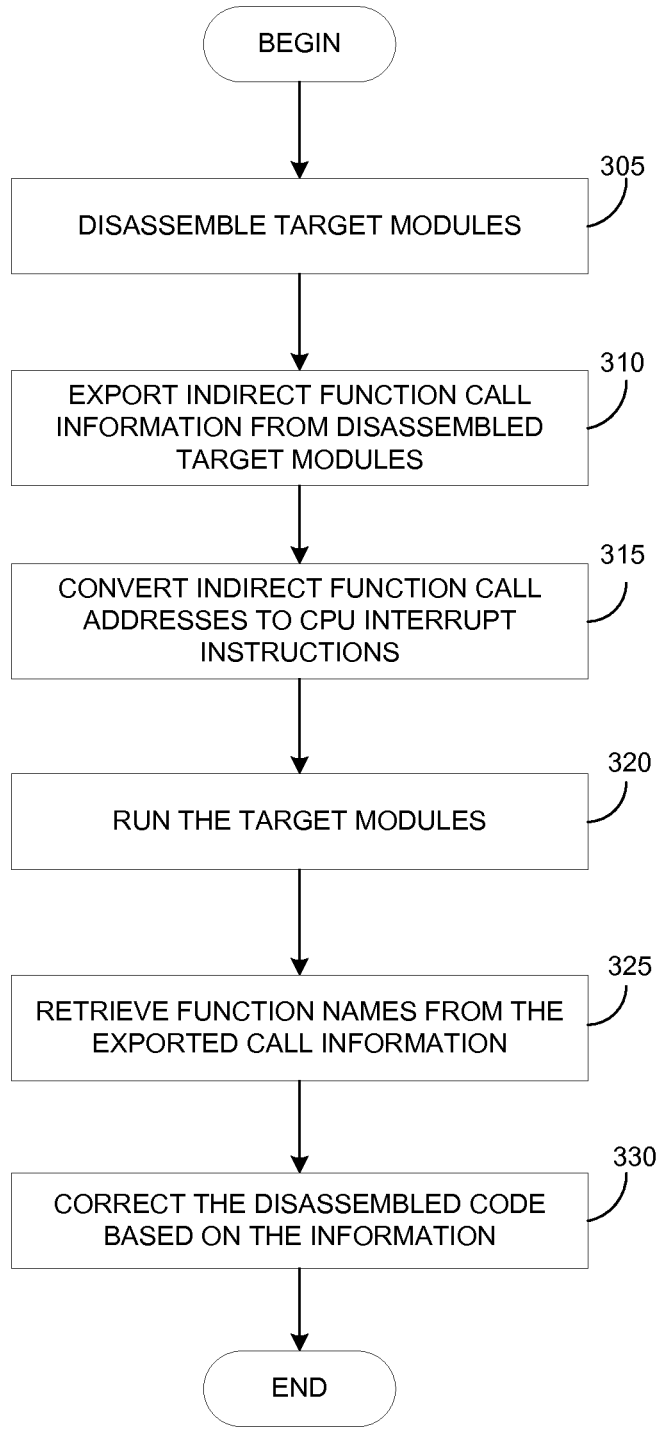
FIG. 3 illustrates a method for tracking indirect function calls of a specified module targeted for disassembly, according to one embodiment.

FIG. 3 illustrates a method 300 for tracking indirect function calls in a module targeted for disassembly, according to one embodiment. Method 300 begins at step 305, where the disassembler 110 generates assembly language source code from the machine language source code of a target module. The resulting disassembled code may include indirect function calls at different points of the code.

At step 310, the disassembler 110 exports indirect function call information from the disassembled code to the tracker component 205. More specifically, the disassembler 110 traverses through each indirect function call identified in the disassembled code and sends memory address information of each of the calls to the tracker component 205.

At step 315, the tracker component 205 converts each address obtained from the disassembled code to a CPU interrupt instruction. For example, the tracker component 205 may replace each function call located at a given address with the CPU interrupt instruction "INT 3," an interrupt instruction used for debugging. Doing so results in a program that is executing in a debugger (e.g., the disassembler 110) to stop at the point where the instruction is located.

At step 320, the computer system 105 executes the disassembled code of the targeted module through the disassembler 110 in a debug mode. While the code is executing, each indirect function call converted into an interrupt may be triggered. Each time a CPU interrupt instruction is triggered, the tracker component 205 collects information associated with the address where the CPU interrupt instruction was triggered, such as a name of the function invoked by the indirect function call. The tracker component 205 may send the collected information to the parser component 210.

At step 325, the parser component 210 receives the address information from the tracker component 205. The parser component 210 uses the address information to retrieve information needed to correct inaccuracies in the disassembled code. Specifically, at each address, the parser component 210 retrieves names, register values, parameters, and the like that are associated with the indirect function call in the disassembled code.

At step 330, the parser component 220 parses the disassembled code and replaces indirect function call values with the correct values (e.g., functional call names) obtained from triggering the interrupt. When the parser component 220 identifies an indirect function call in the disassembled code, the parser component 220 cross-references the indirect function call with the memory address of the function obtained via the interrupt. The parser component 220 retrieves the information received from the tracker component 205. The parser component replaces the values in the disassembled code with the information obtained from the tracker component 205. For instance, the parser component 220 may replace register values specified in an indirect function call with function names obtained from the tracker component 205.

Figure 4:
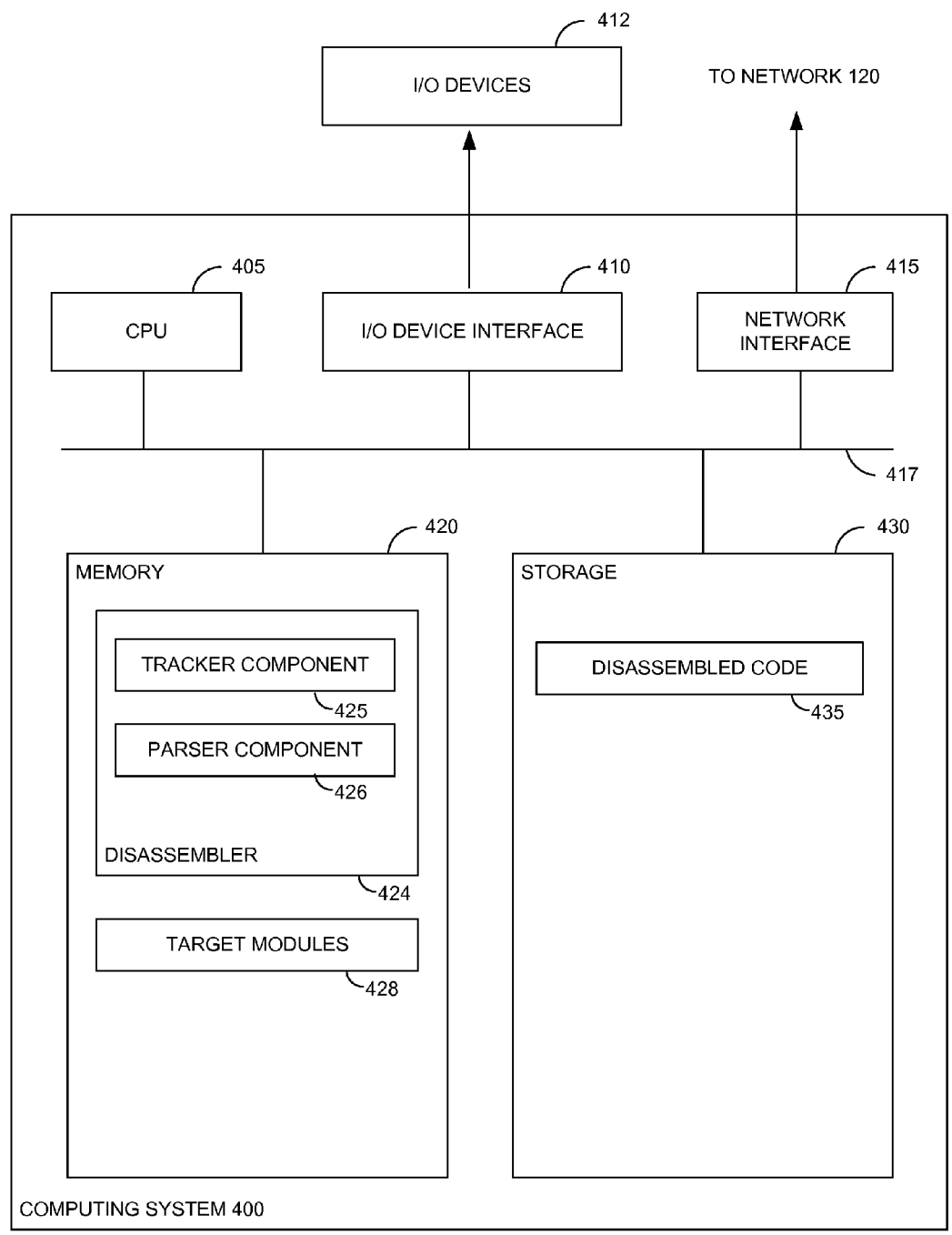
FIG. 4 illustrates a computing system configured to track indirect function calls of a module targeted for disassembly, according to one embodiment.

FIG. 4 illustrates a computing system configured to track indirect function calls in modules targeted for disassembly, according to one embodiment. As shown, the computing system 400 includes, without limitation, a central processing unit (CPU) 405, a network interface 415, a memory 420, and storage 430, each connected to a bus 417. The computing system 400 may also include an I/O device interface 410 connecting I/O devices 412 (e.g., keyboard, mouse, and display devices) to the computing system 400. Further, in context of this disclosure, the computing elements shown in computing system 400 may correspond to a physical computing system (e.g., a system in a data center) or may be a virtual computing instance executing within a computing cloud.

The CPU 405 retrieves and executes programming instructions stored in the memory 420 as well as stores and retrieves application data residing in the memory 430. The interconnect 417 is used to transmit programming instructions and application data between the CPU 405, I/O devices interface 410, storage 430, network interface 415, and memory 420. Note, CPU 405 is included to be representative of a single CPU, multiple CPUs, a single CPU having multiple processing cores, and the like. And the memory 420 is generally included to be representative of a random access memory. The storage 430 may be a disk drive storage device. Although shown as a single unit, the storage 430 may be a combination of fixed and/or removable storage devices, such as fixed disc drives, removable memory cards, or optical storage, network attached storage (NAS), or a storage area-network (SAN).

Illustratively, the memory 420 includes a disassembler 424 and one or more target modules 428. The disassembler 424 generates assembly language code (i.e., disassembled code 435 in storage 430) from machine language code of the target modules 428. In one embodiment, the disassembler 424 may include a tracker component 425 and a parser component 426. After the disassembler 424 has generated the disassembled code 435, the tracker component 425 may collect information related to indirect function calls from the disassembled code, such as a memory address associated with the function. The tracker component 425 may use the memory address information to convert indirect function calls in the target modules 428 to CPU interrupt instructions. Doing so allows the tracker component 425 to capture accurate indirect function call values from the target modules 428 during execution of the target modules 428. The parser component 426 may receive the call values from the tracker component 425 and parse the disassembled code 435 to identify any incorrect values (e.g., function call names associated with an address in a register referenced by an indirect function call) in the code 435. When the parser component 426 identifies indirect function calls, the parser component 426 may replace the incorrect values with the values obtained from the tracker component 425.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet. In context of the present disclosure, a cloud based application may be configured to track indirect function calls in program code of modules targeted for disassembly by exporting indirect function call addresses in a module disassembly and correcting register values in the disassembly while executing the module in real-time.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

While the foregoing is directed to embodiments of the present disclosure, other and further embodiments of the disclosure may be devised without departing from the basic scope thereof, and the scope thereof is determined by the claims that follow.

What is claimed is:

1. A method for disassembling compiled object code, the method comprising:
   disassembling a binary executable object to generate assembly language source code, wherein the assembly language source code includes one or more indirect function calls and wherein each indirect function call corresponds to a function dynamically identified using an address identified when executing the assembly language source code;
   converting one or more of the indirect function calls to one or more central processing unit (CPU) interrupt instructions;
   executing the assembly language source code;
   upon reaching the interrupt instruction to which each indirect function call was converted while executing the assembly language source code, determining a register value stored in a register specified in the indirect function call, wherein the register value specifies a memory address of the identified function; and
   for each interrupt instruction, replacing, in the assembly language source code, the register specified in the indirect function call that was converted to the interrupt instruction with a function name corresponding to the register value, and invoking the identified function.

2. The method of claim 1, wherein the interrupt instruction transfers control of the execution to a debugger module executed to determine the function name.

3. The method of claim 1, wherein the register value specifies a memory address stored in the register when the interrupt instruction is triggered.

4. The method of claim 1, wherein the function name is identified from a memory address stored in the register when the interrupt instruction is triggered.

5. The method of claim 1, wherein the assembly language source code is generated by a disassembler.

6. The method of claim 1, wherein the interrupt instruction is INT 3.

7. The method of claim 1, wherein the assembly language source code is executed in a debugger module.

8. A non-transitory computer-readable storage medium storing instructions, which, when executed on a processor, performs an operation for disassembling compiled object code, the operation comprising:
   disassembling a binary executable object to generate assembly language source code, wherein the assembly language source code includes one or more indirect function calls and wherein each indirect function call corresponds to a function dynamically identified using an address identified when executing the assembly language source code;
   converting one or more of the indirect function calls to one or more central processing unit (CPU) interrupt instructions;
   executing the assembly language source code;
   upon reaching the interrupt instruction to which each indirect function call was converted while executing the assembly language source code, determining a register value stored in a register specified in the indirect function call, wherein the register value specifies a memory address of the identified function; and
   for each interrupt instruction, replacing, in the assembly language source code, the register specified in the indirect function call that was converted to the interrupt instruction with a function name corresponding to the register value, and invoking the identified function.

9. The non-transitory computer-readable storage medium of claim 8, wherein the interrupt instruction transfers control of the execution to a debugger module executed to determine the function name.

10. The non-transitory computer-readable storage medium of claim 8, wherein the register value specifies a memory address stored in the register when the interrupt instruction is triggered.

11. The non-transitory computer-readable storage medium of claim 8, wherein the function name is identified from a memory address stored in the register when the interrupt instruction is triggered.

12. The non-transitory computer-readable storage medium of claim 8, wherein the assembly language source code is generated by a disassembler.

13. The non-transitory computer-readable storage medium of claim 8, wherein the interrupt instruction is INT 3.

14. The non-transitory computer-readable storage medium of claim 8, wherein the assembly language source code is executed in a debugger module.

15. A system, comprising:
   a processor; and
   a memory storing one or more application programs configured to perform an operation for disassembling compiled object code, the operation comprising:

disassembling a binary executable object to generate assembly language source code, wherein the assembly language source code includes one or more indirect function calls and wherein each indirect function call corresponds to a function dynamically identified using an address identified when executing the assembly language source code, converting one or more of the indirect function calls to one or more central processing unit (CPU) interrupt instructions, executing the assembly language source code, upon reaching the interrupt instruction to which each indirect function call was converted while executing the assembly language source code, determining a register value stored in a register specified in the indirect function call, wherein the register value specifies a memory address of the identified function, and for each interrupt instruction, replacing, in the assembly language source code, the register specified in the indirect function call that was converted to the interrupt instruction with a function name corresponding to the register value, and invoking the identified function.

16. The system of claim 15, wherein the interrupt instruction transfers control of the execution to a debugger module executed to determine the function name.

17. The system of claim 15, wherein the register value specifies a memory address stored in the register when the interrupt instruction is triggered.

18. The system of claim 15, wherein the function name is identified from a memory address stored in the register when the interrupt instruction is triggered.

19. The system of claim 15, wherein the assembly language source code is generated by a disassembler.

20. The system of claim 15, wherein the interrupt instruction is INT 3.

* * * * *